(12) United States Patent
Hester

(10) Patent No.: US 10,780,301 B2
(45) Date of Patent: Sep. 22, 2020

(54) PELICAN HOOK

(71) Applicant: Ronald J. Hester, Grant, AL (US)

(72) Inventor: Ronald J. Hester, Grant, AL (US)

( * ) Notice: Subject to any disclaimer, the term of this patent is extended or adjusted under 35 U.S.C. 154(b) by 136 days.

(21) Appl. No.: 16/057,034

(22) Filed: Aug. 7, 2018

(65) Prior Publication Data

US 2020/0047007 A1 Feb. 13, 2020

(51) Int. Cl.
*A62B 35/00* (2006.01)
*F16B 45/02* (2006.01)

(52) U.S. Cl.
CPC .......... *A62B 35/0068* (2013.01); *F16B 45/02* (2013.01)

(58) Field of Classification Search
CPC ............................. A62B 35/0068; F16B 45/02
See application file for complete search history.

(56) References Cited

U.S. PATENT DOCUMENTS

| | | | |
|---|---|---|---|
| 5,400,869 A | 3/1995 | Rocourt | |
| 5,416,955 A | 5/1995 | Katsma | |
| 5,463,798 A | 11/1995 | Wurzer | |
| 5,579,564 A | 12/1996 | Rullo et al. | |
| 6,161,264 A | 12/2000 | Choate | |
| 6,283,524 B1 * | 9/2001 | Simond | A62B 1/04 24/600.1 |
| 7,647,677 B2 | 1/2010 | Casebolt | |
| 7,926,152 B2 | 4/2011 | Emenheiser | |
| 8,001,663 B2 | 8/2011 | Belcourt et al. | |
| 8,100,231 B2 | 1/2012 | Petzl et al. | |
| 8,572,819 B2 | 11/2013 | Yang | |
| 8,752,254 B2 | 6/2014 | Perner | |
| 8,794,379 B2 | 8/2014 | Bronnaz et al. | |
| 8,955,203 B2 | 2/2015 | Tardif | |
| 8,985,658 B2 | 3/2015 | Chepurny et al. | |
| 2007/0062014 A1 * | 3/2007 | Casebolt | F16B 45/02 24/600.1 |
| 2009/0072562 A1 * | 3/2009 | Brunner | B66C 1/34 294/82.2 |
| 2010/0199472 A1 * | 8/2010 | Millar | A62B 1/16 24/599.1 |
| 2010/0200333 A1 | 8/2010 | Maurice et al. | |
| 2016/0376129 A1 * | 12/2016 | Hendrix | F16B 45/02 294/82.2 |

* cited by examiner

*Primary Examiner* — Robert Sandy
*Assistant Examiner* — David M Upchurch
(74) *Attorney, Agent, or Firm* — Angela Holt; Bradley Arant Boult Cummings LLP

(57) ABSTRACT

Pelican hooks and related systems are disclosed. In one embodiment, the pelican hook includes a hook that defines a hook gap, a gate for the hook gap, and a gate mechanism. The gate is configured to be opened so as to open the hook gap and is configured to be closed so as to close the hook gap. The gate mechanism includes a gate actuator for opening the gate and a lock actuator for unlocking the gate. To do this, the gate mechanism is configured such that actuating the lock actuator toward the gate actuator unlocks the gate and such that actuating the gate actuator toward the lock actuator opens the gate. In this manner, the user can operate the pelican hook with a single hand and without having to let go of the pelican hook.

19 Claims, 9 Drawing Sheets

PELICAN HOOK

FIELD OF THE DISCLOSURE

This disclosure relates to pelican hooks.

BACKGROUND

There are many jobs that require personnel to climb dangerously high structures. For example, workers must often climb cellular phone towers and power structures in order to perform repairs or replace equipment. To prevent employees from falling off these structures, safety measures are often taken whereby personnel often wear harnesses when climbing these structures. A cord (e.g., a rope or a strap) is attached to the harness so that a user is suspended on the cord should the user accidently slip when climbing the structure. Pelican hooks are attached to the cords and engage support members (e.g., rails) on the structure to support the user's suspension by the cord. These pelican hooks have gates that allow access into and out of the hook. For safety reasons, the pelican hooks are often configured so that these gates lock close thereby ensuring that the pelican hook does not slip off the support member. Also, for safety reasons, a user often uses two cords with two pelican hooks when climbing a structure to ensure that at least one pelican hook is engaging a support rail when the user is transitioning between support members.

Unfortunately, current arrangements for pelican hooks make them cumbersome and difficult to operate when climbing a structure. For example, a user must often use two hands in order to unlock the pelican hook or open the gate. The user also has to let go of one pelican hook in order to operate the other pelican hook. Thus, when the user is climbing the structure and attaches one of the pelican hooks to a support member that is higher than the previous (and lower) support member used to support the cords, the other pelican hook remains engaged on the previous support member at a lower height. The user must somehow stretch his body down to reach the other pelican hook, unlock the pelican hook, and attach this pelican hook to the higher support member. The entire process can be exhausting for a user trying to climb the structure. As a result, users will often free climb and not use their safety equipment when climbing the structure. Inevitably, this results in deaths and serious injuries when the users fall off the structures due to their failure to utilize their safety equipment.

Accordingly, what is needed are pelican hooks that are easier and more convenient to operate.

SUMMARY

This disclosure relates to pelican hooks and related systems. In one embodiment, the pelican hook includes a hook that defines a hook gap, a gate for the hook gap, and a gate mechanism. The gate is configured to be opened so as to open the hook gap and is configured to be closed so as to close the hook gap. The gate mechanism includes a gate actuator for opening the gate and a lock actuator for unlocking the gate. To do this, the gate mechanism is configured such that actuating the lock actuator toward the gate actuator unlocks the gate and such that actuating the gate actuator toward the lock actuator opens the gate. In this manner, the user can operate the pelican hook with a single hand and without having to let go of the pelican hook. This arrangement thereby greatly facilitates the user's ability to climb a structure using the pelican hook.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

Figure 1:
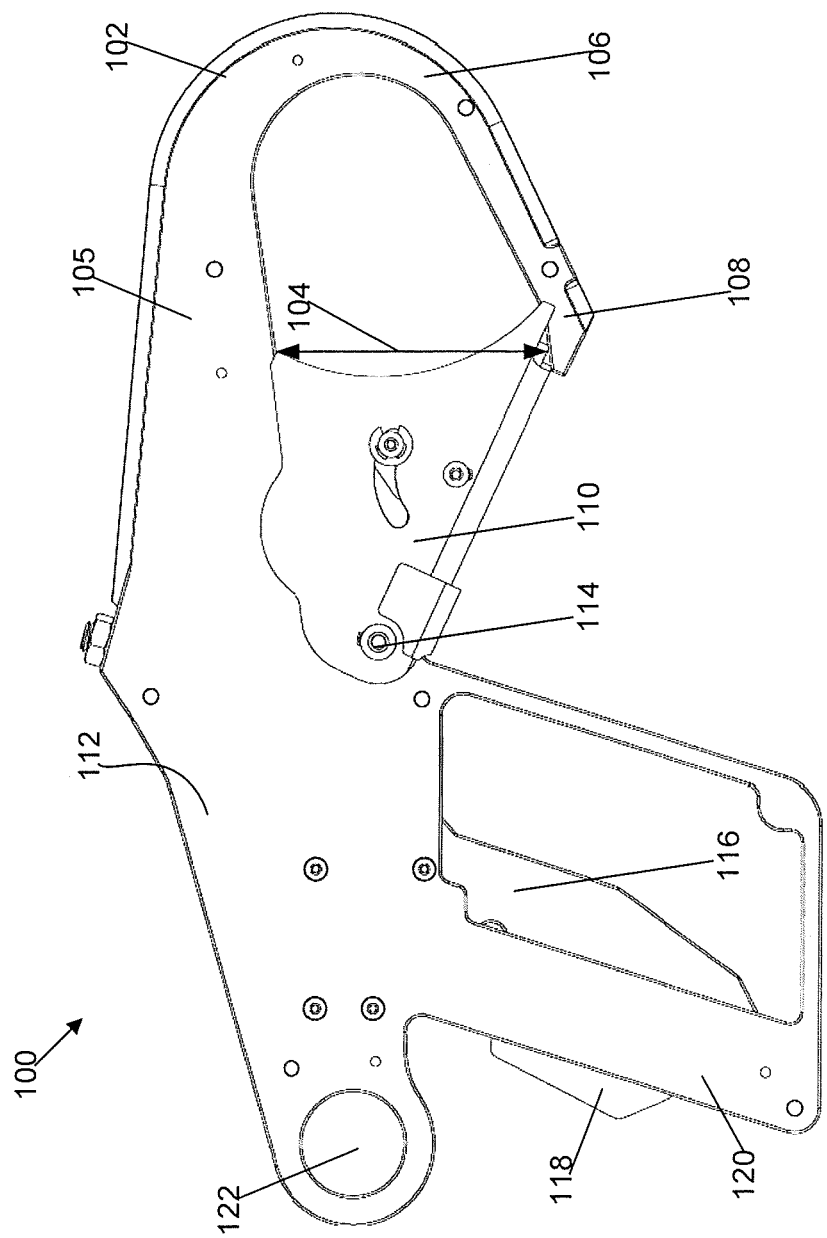
FIG. 1 illustrates an exemplary pelican hook in accordance with this disclosure.

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

This disclosure relates generally to a pelican hook that may be utilized by a user to climb a structure. The pelican hooks disclosed herein may be linked with some type of cord (i.e., rope, strap, etc.) that attaches to a safety harness worn by a user. When the pelican hooks engage a support member (e.g., a rail), a user wearing the harness can be suspended by the cord thereby preventing the user from falling off the support structure. Furthermore, the pelican hooks may be designed to assist the user when climbing up a structure via support members (e.g., a railing system) since the user can disengage and engage a support member with a single hand and without letting go of the pelican hook.

Embodiments of the pelican hook may include a hook, a gate, and a gate mechanism. The hook defines a hook gap so that a support member can be inserted into the hook by a user. The gate is configured to be opened so as to open the hook gap and is configured to be closed so as to close the hook gap. The gate mechanism may be used to open the gate, close the gate, and lock the gate. To operate the pelican hook, the gate mechanism includes a gate actuator and a lock actuator that a user may use to operate the pelican hook. More specifically, the gate mechanism is configured such that actuating the lock actuator toward the gate actuator unlocks the gate and such that actuating the gate actuator toward the lock actuator opens the gate. In this manner, the user can operate the pelican hook with a single hand since an action with the users palm can operate one of either the lock actuator or gate actuator and an action with the user's fingers can operate the other one of the lock actuator or the gate actuator. Accordingly, the user can operate the pelican hook with a single hand and without having to let go of the pelican hook.

It should be noted that the specific embodiments described herein are not intended to limit the scope of the disclosure. For example, the pelican hook specifically described herein includes a handle where the gate actuator is at least partially in front of the handle and the lock actuator is at least partially behind the handle. The gate is opened by actuating the gate actuator toward the back of the handle and actuating the lock actuator toward the front of the handle. However, in alternative embodiments, the opposite arrangement may be used where the gate is opened by actuating the gate actuator toward the front of the handle and by actuating the lock actuator toward the back of the handle. Furthermore, specific embodiments of the gate mechanism are disclosed for opening, closing, locking, and unlocking the gate. However, other types of gate mechanism may be used that use different types of components to lock, unlock, open, and close the gate.

Referring now to FIG. 1, FIG. 1 illustrates a side view of an exemplary pelican hook 100. The pelican hook 100 includes a hook 102 that defines a hook gap 104. More specifically, the hook 102 defines a straight portion 105 and a bent portion 106. The bent portion 106 of the hook 102 has a hook end 108. The space between the hook end 108 and the straight portion 105 defines the hook gap 104.

As shown in FIG. 1, the pelican hook 100 has a gate 110 for the hook gap 104. The gate 110 is configured to grant access to the hook 102 through the hook gap 104. Thus, the gate 110 is configured to be opened so as to open the hook gap 104 and is configured to be closed so as to close the hook gap 104. Accordingly, when the gate 110 is opened, a support member (e.g. a safety rail) can enter the hook 102. When the gate 110 is closed, the support member is enclosed inside the hook 102 in order to prevent the support member from exiting the hook 102. In this example, the pelican hook 100 has a body 112 and includes a hinge 114 that movably connects the gate 110 to the body 112. Thus, the gate 110 is configured to swing open and closed by rotating about the hinge 114.

A gate mechanism 115 (not entirely shown in FIG. 1, see below) is configured to open and close the gate 110. The gate mechanism 115 has a the gate actuator 116, a lock actuator 118, an arm 204 (not shown in FIG. 1), a guide 205 (not shown in FIG. 1) having a set of guide rails 206, 208, 210 (See FIG. 2B), and various spring actuated mechanisms, namely, a gate opening spring actuated mechanism 212 (See FIG. 2, FIG. 3, FIG. 4), an arm horizontal return spring actuated mechanism 214 (See FIG. 2, FIG. 3, FIG. 4), an arm vertical return spring actuated mechanism 216 (See FIG. 2, FIG. 3, FIG. 4), and a gate actuator return spring actuated mechanism 218 (See FIG. 2, FIG. 3, FIG. 4). The gate mechanism 115 is also operable to lock the gate closed. Therefore, once the gate 110 is closed, the gate mechanism 115 is configured to lock the gate 110, which prevents the gate 110 from being opened and ensures that the support member cannot slip out of the hook 112. However, after the gate 100 has been closed and locked, the gate 110 has to be unlocked before the gate 110 can be reopened. To open and unlock the gate 110, the gate mechanism 115 includes a gate actuator 116 and a lock actuator 118.

In the embodiment shown in FIG. 1, the pelican hook 100 has a handle 120 that extends from the body 112 in a direction transverse to a direction that the straight portion 105 of the hook 102 extends out of the body 112. The gate actuator 116 is a gate trigger and the lock actuator 118 is a lock trigger. The gate actuator 116 and the lock actuator 118 also extend out from the body 112 in a direction transverse to the direction that the straight portion 105 of the hook 102 extends out of the body 112. In this example, the gate actuator 116 is configured to be positioned at least partially in front of the handle 120 when the gate 110 is closed by the gate mechanism 115. Furthermore, the lock actuator 118 is configured to be positioned at least partially behind the handle 120 when the gate mechanism 115 locks the gate 110 closed. Thus, in this embodiment, the gate actuator 116 is positioned directly in front of lock actuator 118. The body 112 defines an eyelet 122 so that a cord (e.g., supporting strap, rope, and/or the like) can be attached to the pelican hook 100.

It should be noted that in other alternative embodiments however, the lock actuator 118 is configured to be positioned at least partially in front of the handle 120 when the gate mechanism 115 locks the gate 110 closed. Furthermore, in alternative embodiments, the gate actuator 116 is configured to be positioned at least partially behind the handle 120. Thus, the lock actuator 118 is positioned directly in front of gate actuator 116 in these alternative embodiments. Regardless, the gate actuator 116 and the lock actuator 118 are positioned so that the gate 110 can be unlocked and opened with a single hand and so that the user does not need to let go of the pelican hook 100 in order to perform both actions.

Figure 2:
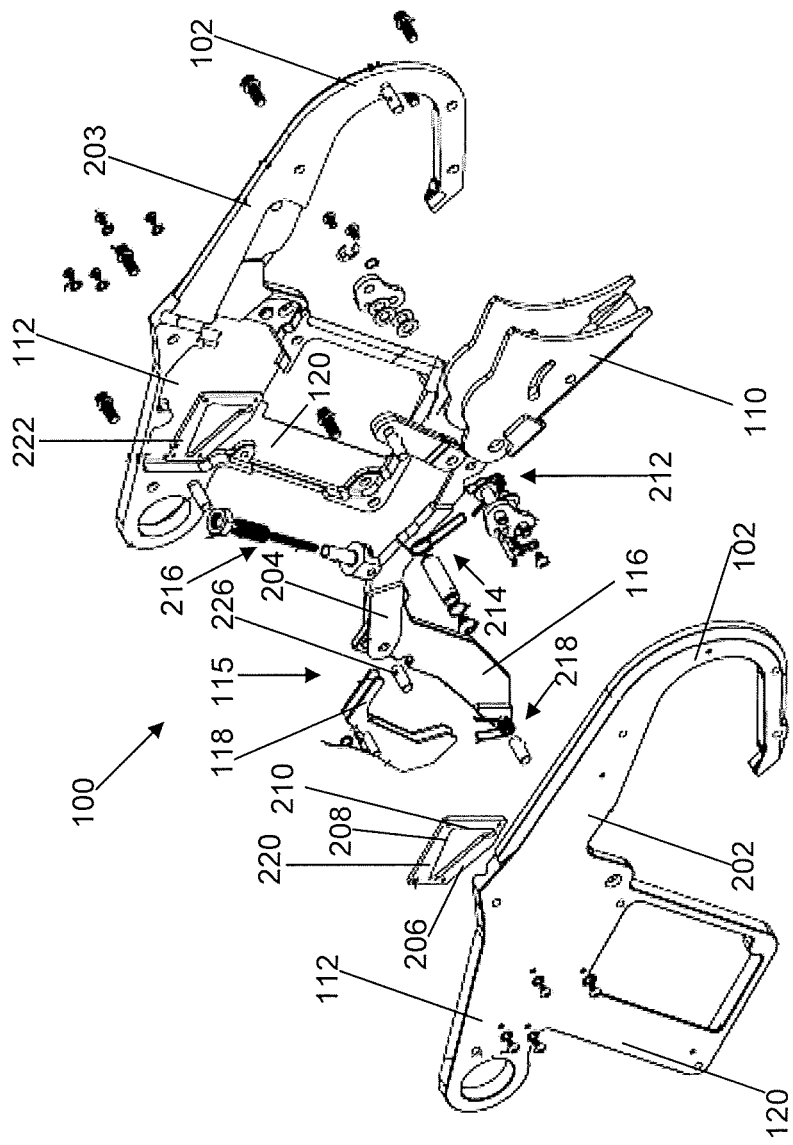
FIG. 2 illustrates an exploded view of one embodiment of the pelican hook shown in FIG. 1.
Figure 3:
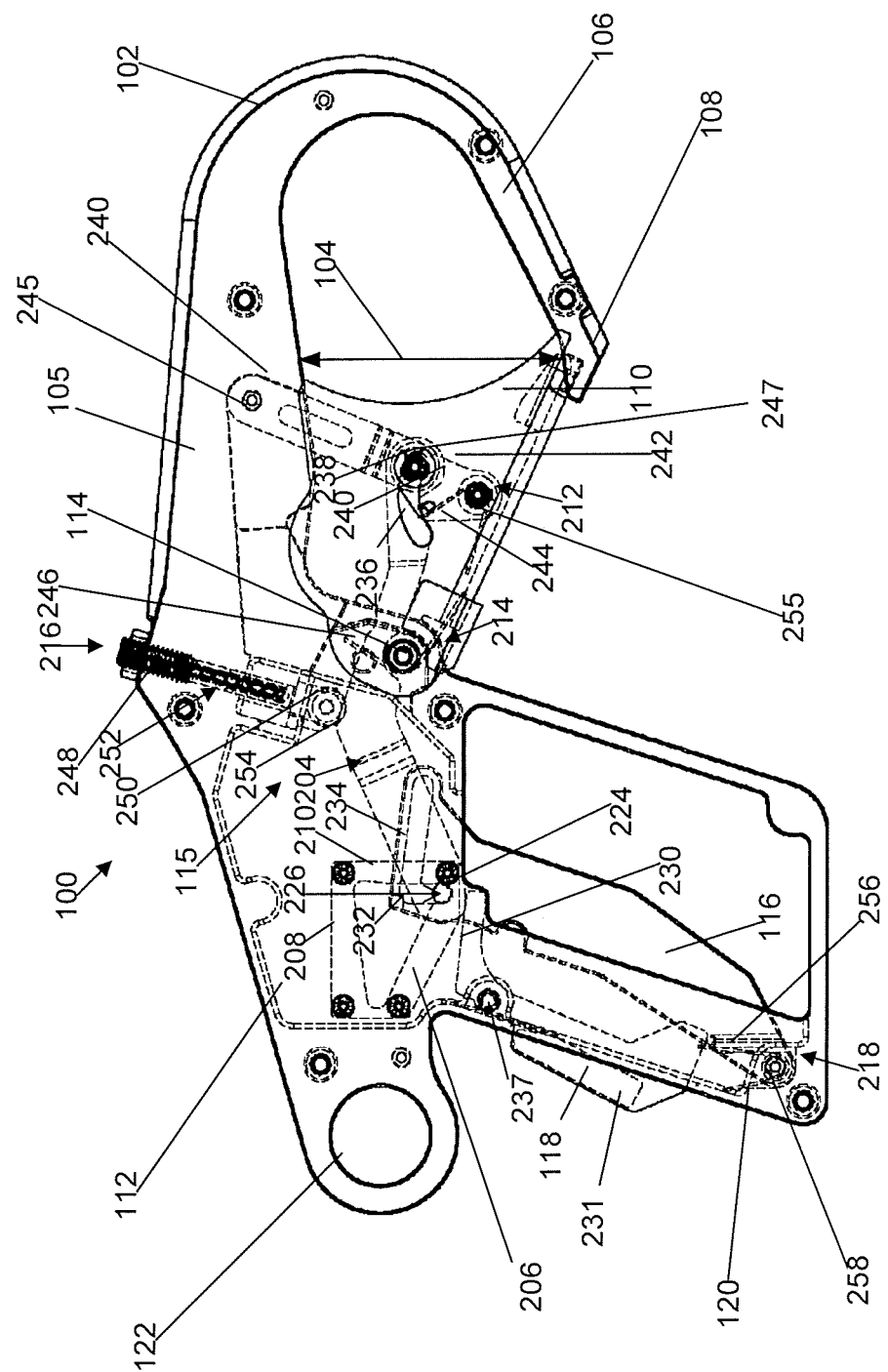
FIG. 3 shows a cross sectional view of the pelican hook shown in FIG. 2 when a gate for a hook gap is closed.
Figure 4:
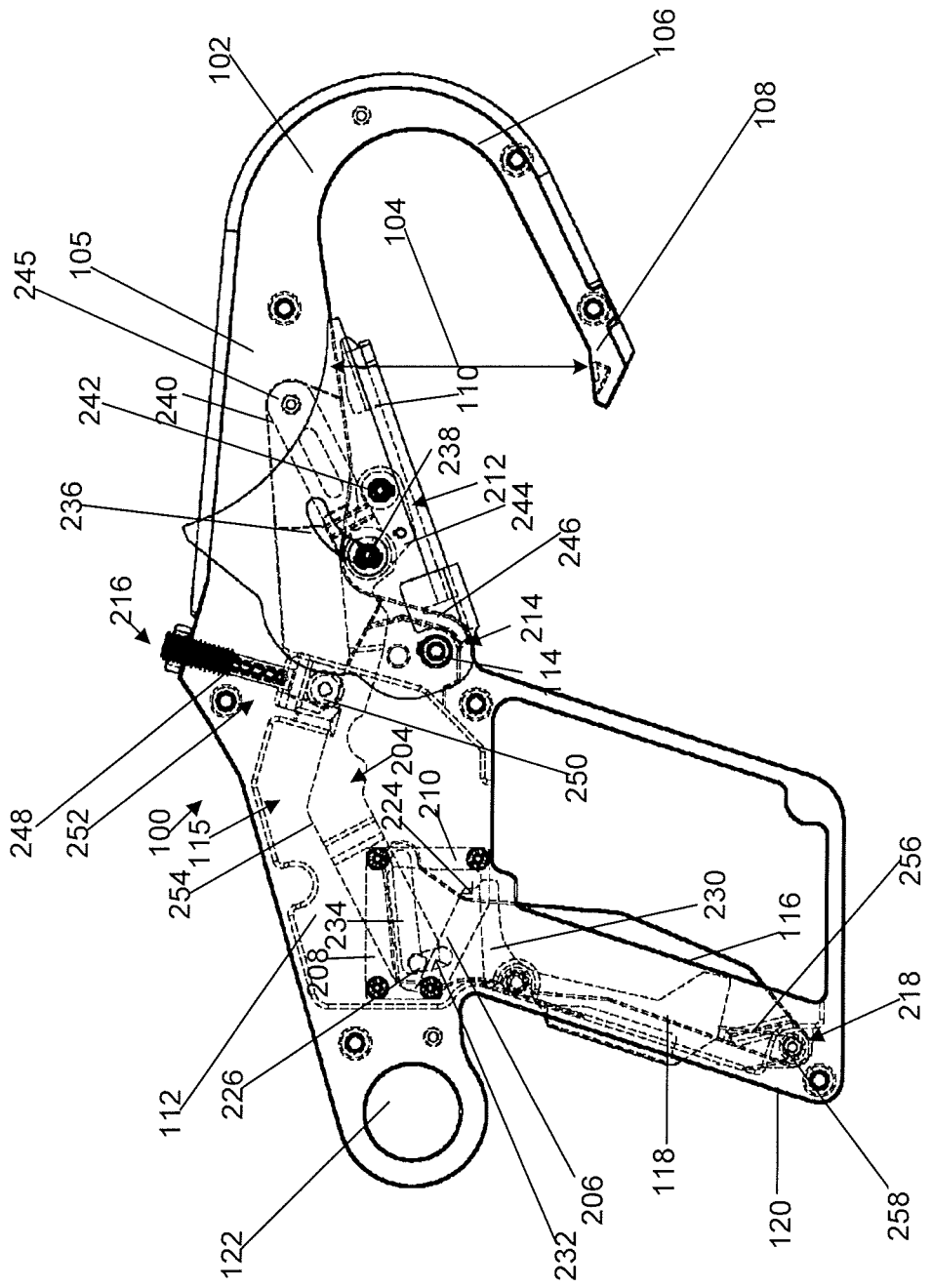
FIG. 4 shows a cross sectional view of the pelican hook shown in FIG. 2 when the gate for the hook gap is opened.

FIG. 2, FIG. 3, and FIG. 4 illustrate the pelican hook 100 shown in FIG. 1 and one embodiment of the gate mechanism 115 that may be utilized to operate the pelican hook 100. More specifically, FIG. 2 illustrates an exploded view the pelican hook 100 while FIG. 3 and FIG. 4 illustrate cross sectional views of the pelican hook 100 when the gate mechanism 115 is assembled. FIG. 3 illustrates the gate mechanism 115 when the gate 110 is locked closed by the gate mechanism 115. Additionally, FIG. 4 illustrates the gate mechanism 115 when the gate 110 has been unlocked and the gate 100 is opened.

Figure 2A:
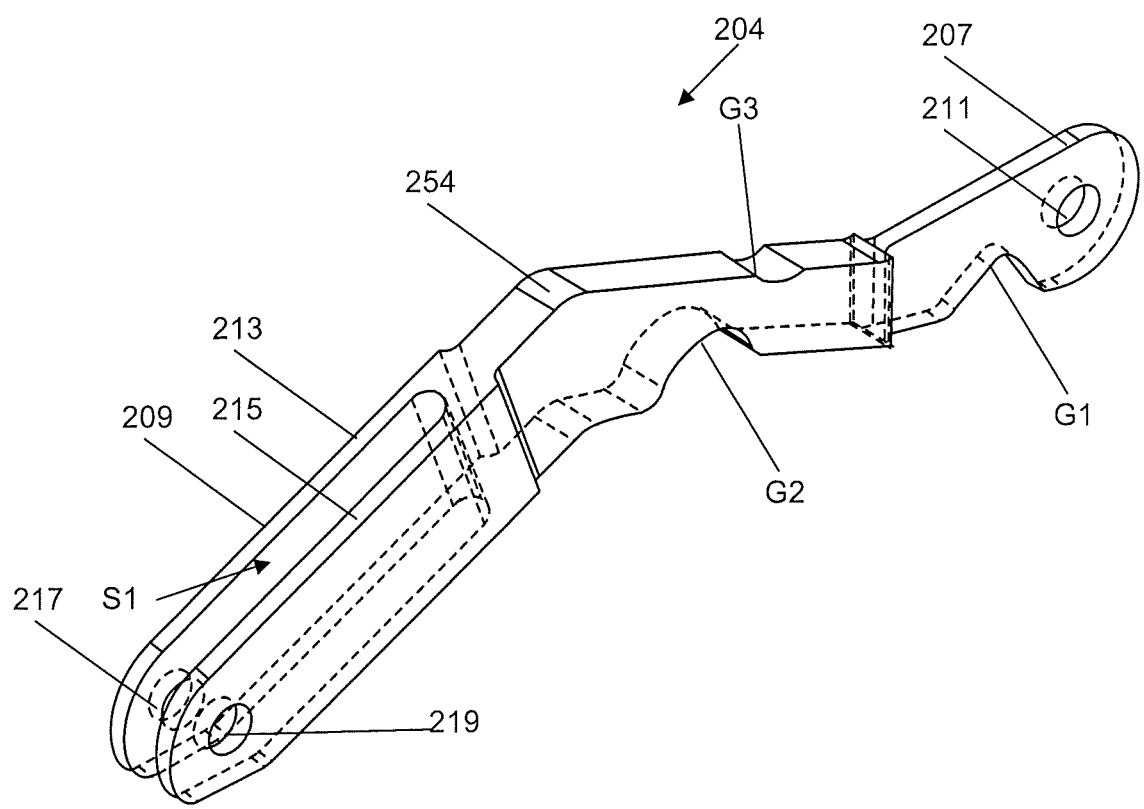
FIG. 2A illustrates a close up view of an arm of the pelican hook shown in FIG. 1 and FIG. 2.

As shown in FIG. 2, a pair of plates 202, 203 join to form the hook 102, the body 112, and the handle 120 of the pelican hook 100. In this embodiment, the gate mechanism 200 includes the gate actuator 116, the lock actuator 118, an arm 204, a guide 205 having a set of guide rails 206, 208, 210 (labeled on plate 220 but not on plate 222 for the sake of clarity), and various spring actuated mechanisms, namely, a gate opening spring actuated mechanism 212, an arm horizontal return spring actuated mechanism 214, an arm vertical return spring actuated mechanism 216, and a gate actuator return spring actuated mechanism 218. The arm 204 is shown specifically in FIG. 2A while the guide 205 is specifically shown in FIG. 2B. As explained in further detail below, the arm 204 in FIG. 2A is connected between the gate 110 and the gate actuator 116. With regards to the guide 205 shown in FIG. 2B, the guide 205 is formed by a pair of plates 220 (See FIG. 2), 222 (See FIG. 2) when the pair of plates 220, 222 are connected together.

Referring now to FIG. 2A, FIG. 2A illustrates one embodiment of the arm 204. As shown in FIG. 2A, the arm 204 defines an end 207 that is connected to the gate 110 (See FIG. 1) and an oppositely disposed end 209 is connected to a gate actuator 116 (See FIG. 1). More specifically, the end 207 includes an aperture 211 that receives a guide pin 238 (See FIG. 3). The guide pin 238 is inserted in a passage 236

(See FIG. 3) formed by the gate 110 whereby the guide pin 238 connects the arm 204 to the gate 110. At the end 209, the arm 204 splits into a pair of branches 213, 215 that define a space S1 between the branches 213, 215. Each of the branches 213, 215 includes an aperture 217, 219. A locking pin 236 (See FIG. 3) is inserted through the apertures 217, 219. The locking pin 236 is inserted into a groove 232 (See FIG. 3B) or slides through a passage 234 (See FIG. 3B) formed by the gate actuator 116 (See FIG. 3B). In this manner, the locking pin 236 connects the arm 204 to the gate actuator 116. Furthermore, the gate actuator 116 is positioned so that the groove 232 and the passage 234 are provided between the branches 213, 215 in the spacing S1.

Note that the arm 204 shown in FIG. 2A defines three grooves G1, G2, G3. Groove G1 is formed near the 207 and allows for the arm 204 to avoid the gate opening spring actuated mechanism 212 (See FIG. 2). The groove G2 is positioned to receive the arm horizontal return spring actuated mechanism 214 (See FIG. 2) when the gate actuator 116 is not actuated. Finally, the groove G3 is positioned to receive a cam follower 250 (See FIG. 3) when the gate actuator 116 has been fully actuated.

Figure 2B:
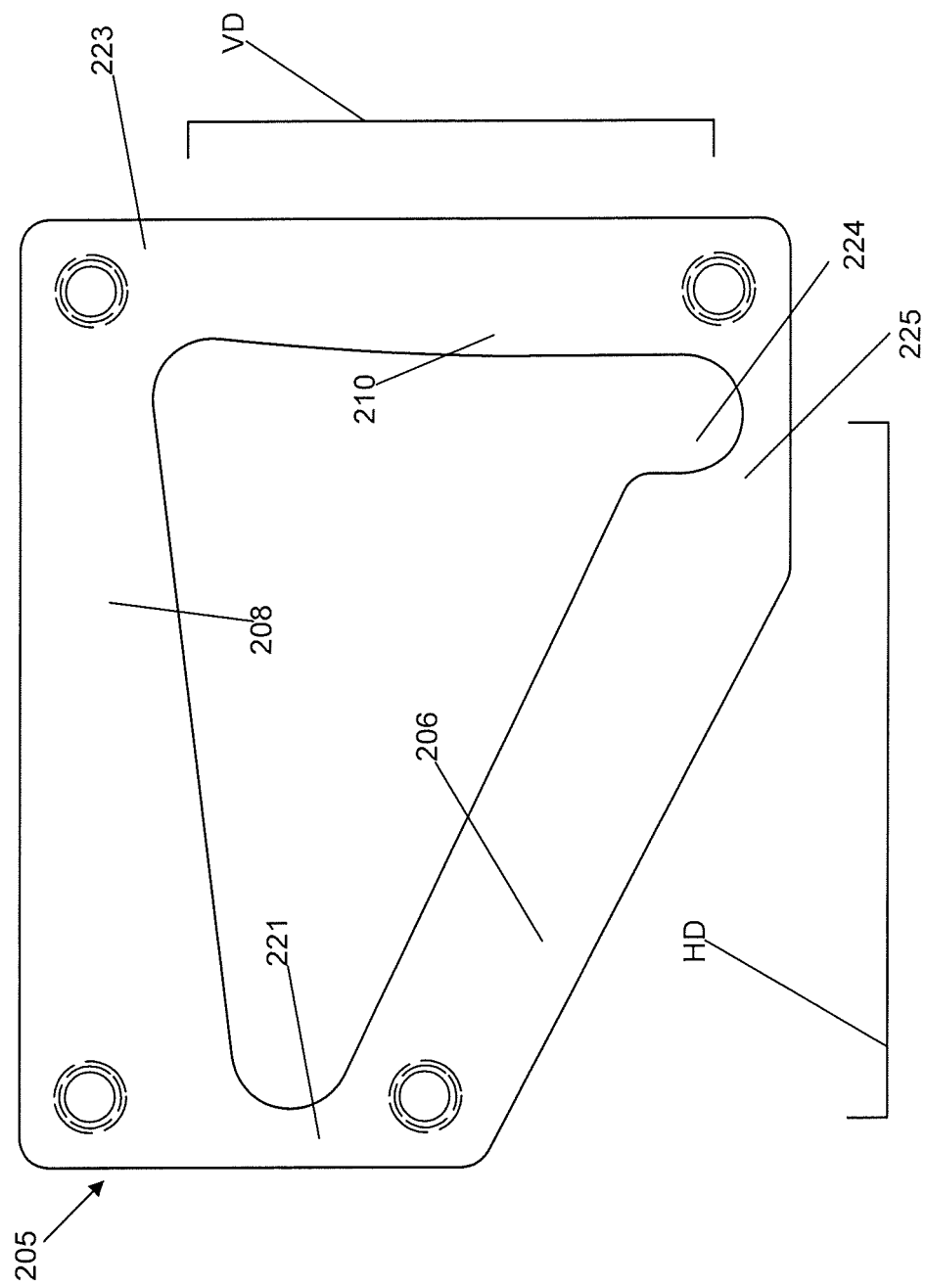
FIG. 2B illustrates a close up view of a triangular guide of the pelican hook shown in FIG. 1 and FIG. 2.

As shown in FIG. 2B, the guide rails 206, 208, 210 are connected in a triangular arrangement to form the guide 205. The guide rail 206 provides the hypotenuse of the triangular arrangement and is slanted (has both vertical and horizontal components). The guide rail 208 forms a side of the triangular arrangement that is substantially horizontal and the guide rail 210 forms a side of the triangular arrangement that is substantially vertical. The guide rail 208 connects the two highest ends 221, 223 (See FIG. 2B) of the guide rail 206 and the guide rail 210. The guide rail 210 connects the two ends 223, 225 (See FIG. 2B) of the guide rail 208 and the guide rail 206 that are closest to the hook 102 and the gate 110. At a bottom end 225 (See FIG. 2B) of the guide rail 206, the guide rail 206 defines a lock groove 224 (See FIG. 2B, FIG. 3 and FIG. 4).

It should be noted that the pelican hook 100 may be disassembled to change out components (e.g., springs). In this example, the pair of plates 202, 203 and the pair of plates 220, 222 are assembled with screws. It should be noted that in other embodiments some or all of the plates 202, 203, 220, 222 may not be provided to form the corresponding components of the pelican hook 100. Instead, stamping or casting may be used to form alternative embodiments of the components of the pelican hook 100. Furthermore, other suitable connectors may be used to assemble alternative embodiments of the pelican hook 100, such as rivets.

Figure 3A:
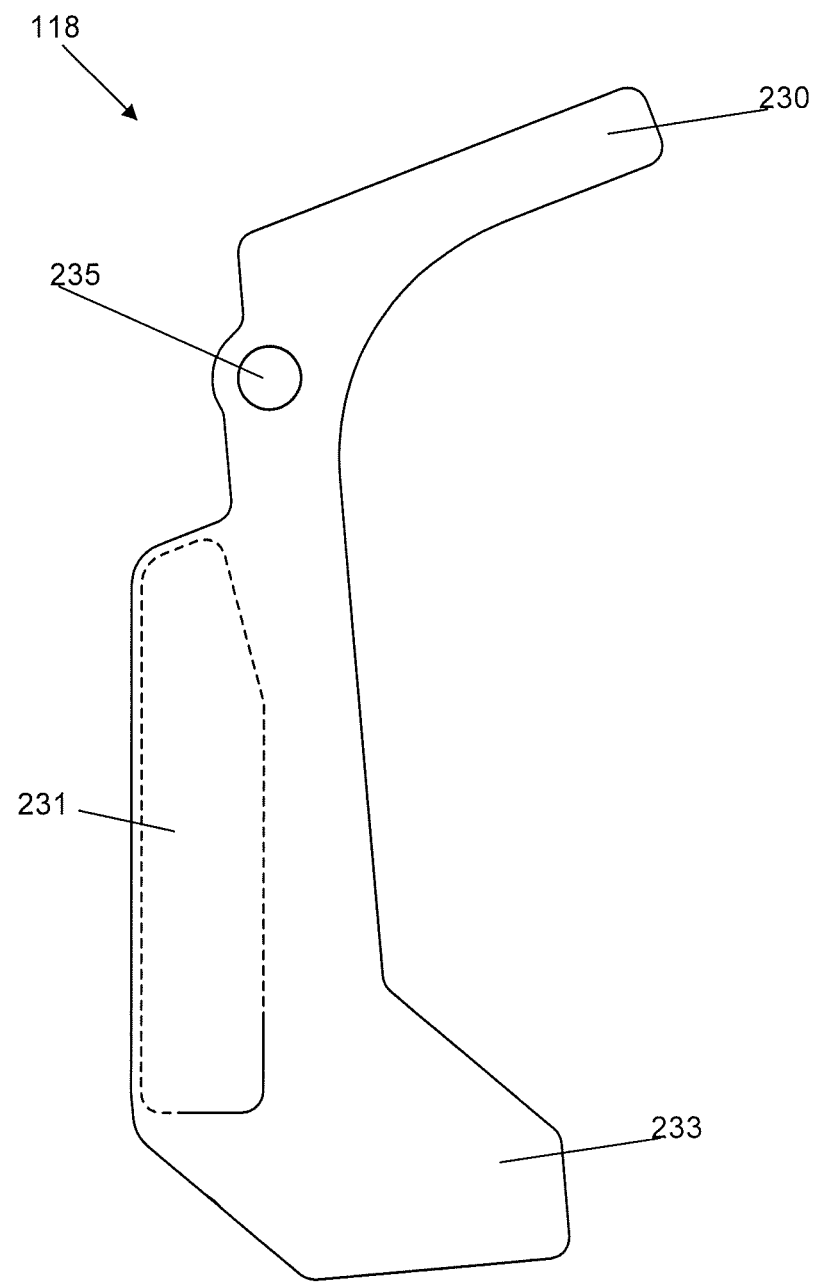
FIG. 3A illustrates a close up view of a lock actuator in the pelican hook shown in FIG. 1.
Figure 3B:
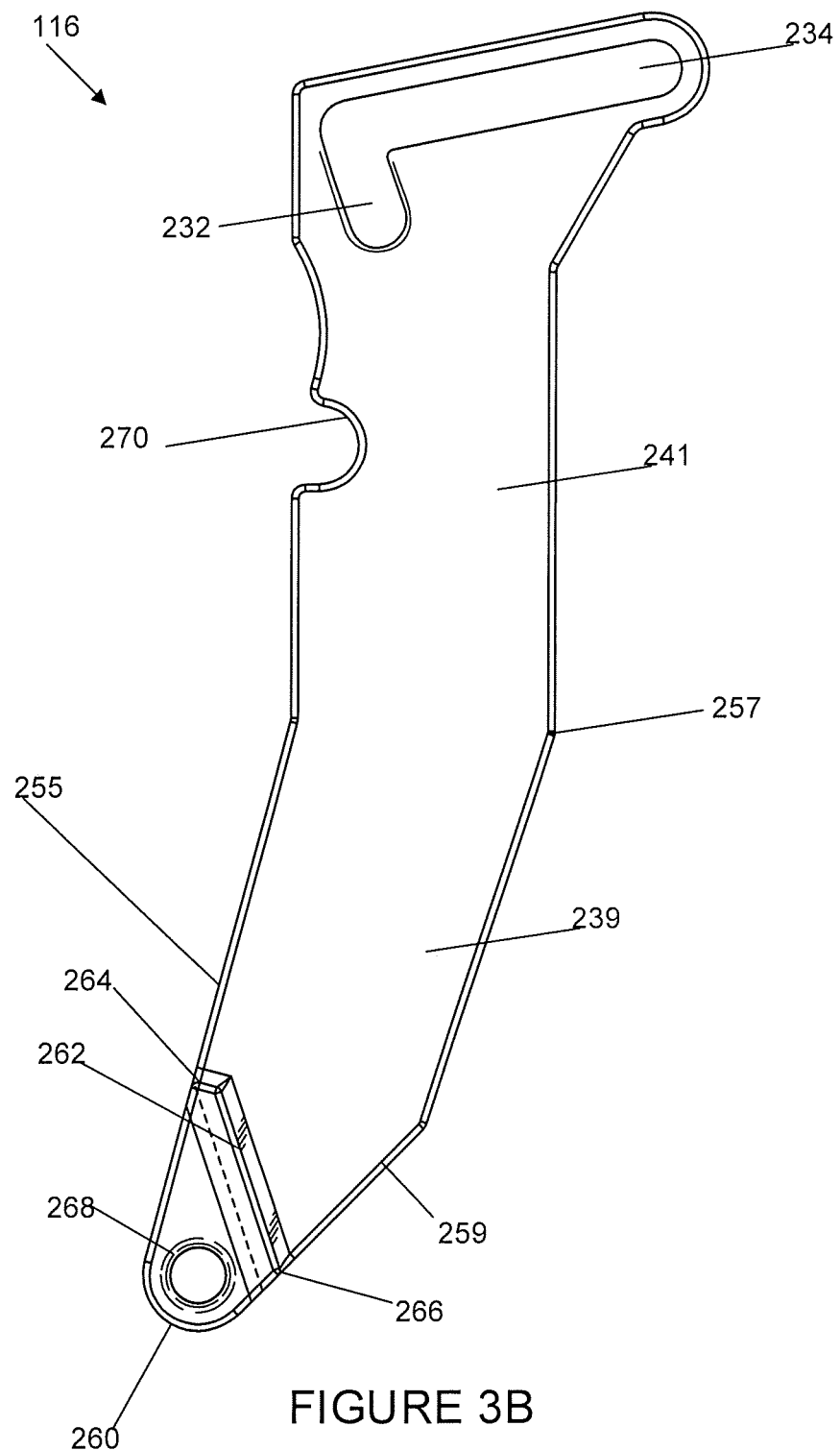
FIG. 3B illustrates a close up view of a gate actuator in the pelican hook shown in FIG. 1.

Referring now to FIG. 3 and FIG. 4, the gate mechanism 200 includes a locking pin 226 where the locking pin 226 is used to attach the arm 204 to the gate actuator 116 (shown specifically in FIG. 3B). Thus, the arm 204 is connected between the gate 110 and the gate actuator 116. However, the locking pin 226 extends transversely out of the arm 204 and is positioned to be placed in the lock groove 224 when the gate 110 is closed. When the locking pin 226 is in the lock groove 224, the arm 204 cannot be pulled by the gate actuator 116 toward the lock actuator 118 (or toward the back of the handle 120) since the locking pin 226 extends transversely through the lock groove 224 thereby preventing any forward or backward motion by the locking pin 226. Accordingly, the arm 204 cannot be pulled by the gate actuator 116 when the locking pin 226 is in the lock groove 224. As a result, the gate 110 is locked closed when the locking pin 226 is in the lock groove 224. In this embodiment, the lock groove 224 is formed at the bottom end 225 of the (slanted) guide rail 206.

The lock actuator 118 (shown specifically in FIG. 3A) is configured to remove the locking pin 226 out of the lock groove 224 when the lock actuator 118 is actuated toward the gate actuator 116 (e.g., toward the front of the handle 120) and thereby unlock the gate 110. A user can do this while holding the handle 120 by simply pressing their palm against the locking actuator 118. In this embodiment, the lock actuator 118 is swingably connected to the handle 120 by a hinge 237 (See FIG. 3). The lock actuator 118 forms an extended portion 230 that is positioned beneath the lock groove 224 prior to the lock actuator 118 being moved toward the gate actuator 116. The extended portion 230 is swung upward and moves the locking pin 226 out of the lock groove 224 when the lock actuator 118 is swung toward the front of the handle 120. Once the locking pin 226 is out of the lock groove 224, the gate 110 is unlocked. Thus, the locking pin 226 can be move forward and backwards. Accordingly, the arm 204 is configured to be pulled by actuating the gate actuator 116 toward the lock actuator 118 (which in this example is toward the back of the handle 120) when the gate 110 is unlocked. To actuate the gate actuator 116 and open the gate 110, the user holds the handle 120 and squeezes their fingers against the front of the gate actuator 116 and towards the handle 120. The locking pin 226 is coupled to both the gate actuator 116 and the arm 204. When the user squeezes their fingers and pulls the gate actuator 116 backwards, the gate actuator 116 is moved backwards toward the back of the handle 120. Since the locking pin 226 is connected to the gate actuator 116, pulling the gate actuator 116 backwards toward the back of the handle 120 creates a backward force on the locking pin 226 that also pulls the locking pin 226 backwards. As mentioned above, the locking pin 226 is also connected to the arm 204. As a result, the arm 204 is thereby pulled backwards to open the gate 110.

FIG. 3A illustrates a close up view of the lock actuator 118 while FIG. 3B shows a close up view of the gate actuator 116. The gate mechanism 115 is configured such that actuating the lock actuator 118 toward the gate actuator 116 unlocks the gate 110 and is configured such that actuating the gate actuator 116 toward the lock actuator 118 opens the gate 110. In this manner, a user can easily unlock and open the gate 110 with a single hand and does not need to let go of the pelican hook 100 in order to perform both actions.

Referring now to FIG. 3A, the extended portion 230 is shown and is the portion of the lock actuator 118 that engages the locking pin 226 when the lock actuator 118 is actuated toward the gate actuator 116. In this example, the lock actuator 118 is swung in a counter clockwise direction to engage the locking pin 226 and remove the locking pin 226 from the lock groove 224. A back portion 231 of the lock actuator 118 extends behind the handle 120 when the lock actuator 118 is at rest before the lock actuator 118 is actuated toward the gate actuator 116.

Also, as shown in FIG. 3A, the lock actuator 118 further includes a guide portion 233 at the bottom of the lock actuator 118. The guide portion 233 extends toward the gate actuator 116. In this example, the lock actuator 118 is configured to receive the gate actuator 116 when the gate actuator 116 is actuated toward the lock actuator 118. The guide portion 233 is provided to maintain the gate actuator 116 appropriately aligned with the lock actuator 118 when the gate actuator 116 has not been actuated and is at rest. Also, as shown in FIG. 3A, the lock actuator 118 includes an opening 235 behind the extended portion 230. This opening 235 is used to form a hinge 237 (See FIG. 3). The lock actuator 118 is configured to swing about the hinge 237 so that the extended portion 230 engages the locking pin 226 and removes the locking pin 226 from the lock groove 224.

Referring now to FIG. 3B, FIG. 3B is a close up view of one embodiment of the gate actuator 116. Near the top of the gate actuator 116, the gate actuator 116 defines another groove 232 and a channel 234. The channel 234 extends across the top of the gate actuator 116 and is continuous with the groove 232. Thus, the groove 232 and the channel 234 form an L-shaped female connector that connects the locking pin 226 (i.e., the male connector) to the gate actuator 116. As shown in FIG. 3B, the bottom portion 239 of the gate actuator 116 is angled with respect to the top portion 241 of the gate actuator 116 so that the bottom portion 239 bends backwards towards the lock actuator 118. This allows for the back edge 255 of bottom portion 239 to be received in the guide portion 233 of the lock actuator 118 when the gate actuator 116 is at rest and not actuated toward the lock actuator 118. Furthermore, this allows for a front edge 257 of the gate actuator 116 to be bent so as to more comfortably be engaged by human fingers.

Note that the bottom end 259 of the bottom portion 239 is tapered to form a rounded tip 260. An engagement surface 262 extends transversely out of the bottom portion 259. The engagement surface 262 is angled across the bottom portion 259 so that the engagement surface 262 has a top end 264 at the back edge 255 and a bottom end 266 is provided at the front edge 257. Furthermore, an opening 268 is formed at or near the rounded tip, which is under the engagement surface 262. A pin 258 (See FIG. 4) of the gate actuator return spring actuated mechanism 218 is inserted traversely through the opening 268 to form a hinge. The engagement surface 262 and the hinge formed by the opening 268 and the pin 258 allow for a torsion spring of the gate actuator return spring actuated mechanism 218 to contract when the gate actuator 116 is actuated toward the lock actuator 118. Furthermore, note that a groove 270 is formed by the back edge 255 of the gate actuator 116. The hinge 237 (See FIG. 3) is inserted into the groove 270 when the gate actuator 116 has been fully actuated. In this manner, the gate actuator 116 is prevented from being pulled back any further so that a user knows that the gate actuator 116 has been fully actuated.

Referring again to FIG. 3 and FIG. 4, the gate opening spring actuated mechanism 212 and the arm horizontal return spring actuated mechanism 214 create forces trying to pull the arm 204 and thus the locking pin 226 forward when the gate actuator 116 is pulled backwards to open the gate 110. However, while the locking pin 226 remains in the groove 232, these forces are opposed and the arm 204 is pulled back as the user pulls the gate actuator 116 back with their fingers. Thus, as the user pulls the gate actuator 116, the arm 204 is pulled back and the gate 110 swings open. Furthermore, the potential energy in the spring actuated mechanisms 212, 214 increases as the gate actuator 116 is pulled and the gate 110 is opened.

Note however that the guide rail 206 is slanted and makes contact against the locking pin 226 as the gate actuator 116 is pulled backwards. The guide rail 206 is slanted upward thus pushing the locking pin 226 upward as the gate actuator 116 is pulled toward the back of the handle 120. As shown in FIG. 4, the guide rail 206 is positioned so as to remove the locking pin 226 from the groove 232 and into the channel 234 once the gate actuator 116 has been actuated a vertical distance VD (See FIG. 2B) and a horizontal distance HD (See FIG. 2B). The vertical distance VD and the horizontal distance HD of course is determined by the angle of the guide rail 206 and the height of the groove 232. In this example, the distance HD of the total displacement is the hypotenuse of the vertical distance VD and the horizontal distance HD, which is the length of the guide rail 206. The distance HD can be measured from the position of the gate actuator 116 prior to being actuated to the position of the gate actuator 116 when the gate actuator 116 is fully actuated (e.g., when the gate trigger is fully pulled). Once the locking pin 226 is in the channel 234, the spring actuated mechanisms 212, 214 are each configured to release potential energy so that the arm 204 is pulled to reopen the gate 110 as the locking pin 226 moves through the channel 234.

Figure 5:
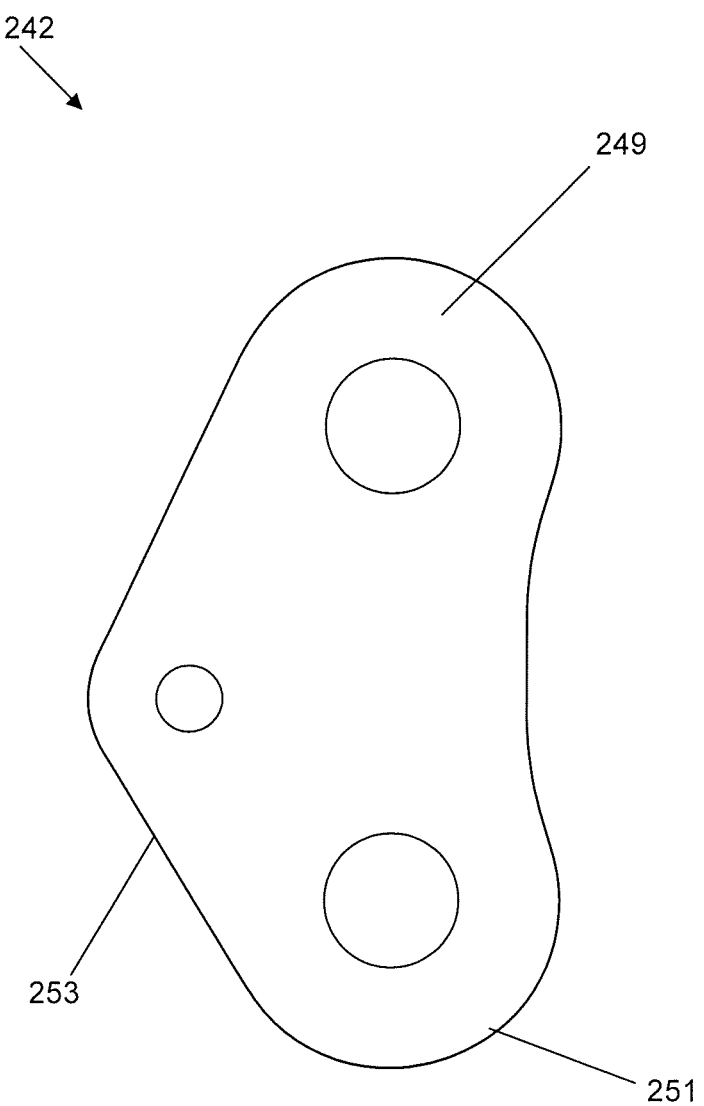
FIG. 5 illustrates a close up view of a cam of the pelican hook shown in FIG. 2.

With regards to the gate opening spring actuated mechanism 212, FIG. 3 illustrates the gate opening spring actuated mechanism 212 when the gate 110 is closed and FIG. 4 illustrates the gate opening spring actuated mechanism 212 when the gate 110 is opened. The gate 110 defines a passage 236. The gate opening spring actuated mechanism 212 includes a guide pin 238, a movable lever 240, a cam 242 (See FIG. 5), and a torsion spring 244. The guide pin 238 is inserted into the passage 236 from an exterior of the gate 110 to an interior of the gate 110. In this case, the passage 236 is slightly curved in order to allow the guide pin 238 to smoothly pass through the passage 236 as the gate 110 is being opened and closed.

The torsion spring 244 engages the gate 110 and the cam 242. The cam 242 is specifically shown in FIG. 5. Furthermore, the movable lever 240 has one end 245 that is movable and attached to the straight portion 105 of the hook 106 and has an oppositely disposed end 247 attached to the guide pin 238. The guide pin 238 also is connected to one end 249 (See FIG. 5) of the cam 242 while the opposite end 251 (See FIG. 5) of the cam 242 provides a hinge 255 (See FIG. 3) for the torsion spring 244, which engages the inside of the gate 110. The cam 242 is thus movably attached to the arm 204 and is movably attached to the movable lever 240 such that the movably lever 240 is configured to turn the cam 242 as the gate 110 is being opened and slides the guide pin 238 through the passage 236 in the gate 110. The movable lever 240 thus swings upward and backwards as the arm 204 is pulled backward. Accordingly, the movable lever 240 partially translates the horizontal force created by pulling the arm 204 backwards into a vertical force needed to pull the gate 110 upwards to open the gate 110.

One (lower) end 251 of the cam 242 is resting on the gate 110 (See FIG. 3) when the gate 110 is closed and the torsion spring 244 is decompressed. However, a side 253 (See FIG. 5) of the cam 242 is not resting on the gate 110 because the cam 242 has a more vertical orientation. When the gate actuator 116 is actuated toward the lock actuator 118 and the gate 110 is opened, the cam 242 is turned and rests on one the side 253. The cam 242 is now in a more horizontal orientation (See FIG. 4). As a result, turning the cam 242 and opening the gate 110 causes the torsion spring 244 to compress and create a force that opposes the opening of the gate 110. However, the potential energy stored in the torsion spring 244 cannot be released while the locking pin 226 is in the groove 232.

With regards to the arm horizontal return spring actuated mechanism 214, the arm horizontal return spring actuated mechanism 214 includes the hinge 114 and a torsion spring 246. The hinge 114 is the hinge 114 that swings the gate 110 open and closed, as mentioned above. The torsion spring 246 also engages the inside of the gate 110. As the gate 110 is closed, the torsion spring 246 is compressed and stores potential energy. Opening the gate 110 thus causes the torsion spring 246 to create a force that opposes the opening of the gate 110. However, the potential energy stored in the torsion spring 246 also cannot be released while the locking pin 226 remains in the groove 232.

With regards to the arm vertical return spring actuated mechanism 216, the arm vertical return spring actuated mechanism 216 is configured to return the arm 204 into position when the gate 110 is transitioning from being opened to being closed. The arm vertical return spring actuated mechanism 216 includes a spring coil 248 and a cam follower 250. In this embodiment, the spring coil 248 is inserted within a channel 252 formed at the top of the body 112. The spring coil 248 engages the cam follower 250 and the cam follower 250 engages the top of the arm 204. More specifically, the spring coil 248 extends through the channel 252 and onto the cam follower 250. In this embodiment, the arm 204 defines a bend 254 and the cam follower 250 engages the cam follower 250 on one side of the bend 254.

The cam follower 250 engages the arm 204 near the bend 254 when the gate 110 is closed (See FIG. 3). Furthermore, due to the guide rail 206, the arm 204 is positioned at its lowest vertical position when the gate 110 is closed and the locking pin 226 is in the lock groove 224. Thus, the spring coil 248 is at its most decompressed when the gate 110 is closed and the locking pin 226 is in the lock groove 224. However, once the gate 110 is unlocked and the gate actuator 116 is actuated toward the back of the handle 120, the guide rail 206 pushes the arm 204 upward thereby causing the cam follower 250 to compress the spring coil 248 so that the spring coil 248 stores potential energy. Furthermore, the cam follower 250 slides down the arm 204 toward the front of the arm 204 as the gate actuator 116 is actuated toward the lock actuator 118. The spring coil 248 thus creates a force that is pushing the arm 204 downward (See FIG. 4). The potential energy in the spring coil 248 however cannot be released until the gate actuator 116 is released by the user.

With regards to the gate actuator return spring actuated mechanism 218, the gate actuator return spring actuated mechanism 218 is configured to return the gate actuator 116 to its original position after the gate 110 has been opened. The gate actuator return spring actuated mechanism 218 includes a torsion spring 256 and a pin 258. The pin 258 provides a hinge about which the torsion spring 256 is compressed and decompressed. Furthermore, the torsion spring 256 engages the handle 120 and the gate actuator 116 so that the torsion spring 256 is compressed as the gate actuator 116 is actuated toward the back of the handle 120. As the gate actuator 116 is actuated toward the lock actuator 118, the torsion spring 256 is compressed and stores potential energy. Actuating the gate actuator 116 toward the lock actuator 118 thus causes the torsion spring 256 to create a force that opposes the actuation of the gate actuator 116. However, the potential energy stored in the torsion spring 256 cannot be released until the gate actuator 116 is released by the user.

Once the user has fully actuated the gate actuator 116, the slant in the guide rail 206 causes the locking pin 226 to move out of the groove 232 and into the channel 234 (See FIG. 4). In this position, the locking pin 226 and the groove 232 no longer oppose the force created by the torsion springs 244, 246. The potential energy stored in the torsion springs 244, 246 is released and the arm 204 is pulled forward as the locking pin 226 travels to the front of the channel 252. The torsion spring 244 thus again turns the cam 242 so that the cam 242 stands on its corresponding end 251, which thereby causes the movable lever 240 to swing forward and downward. This thereby causes the guide pin 238 to travel up the passage 236. Furthermore, as the torsion spring 246 decompresses, the torsion spring 246 creates a force that swings the gate 110 downward about the hinge 114 until the gate 110 meets the hook end 108.

The gate 110 is as a result closed (but is not locked). The guide rail 208 provides a vertical limit for the gate actuator 116. Note however that the user's fingers may continue to press the gate actuator 116 so that the gate actuator 116 is fully actuated toward the back of the handle 120 when the gate 110 is reclosed. In this case, the locking pin 226 will have traveled to the front of the channel 234 and is positioned at the vertex that connects the guide rail 208 and the guide rail 210 (i.e., the right most end of the guide rail 208 and the top end of the guide rail 210 in FIG. 3 and FIG. 4). The gate 110 has now been automatically reclosed but remains unlocked since the user's fingers are still pressing the gate actuator 116.

Once the user releases the gate actuator 116, the potential energy stored in the spring coil 248 and the torsion spring 256 is released by the user. The force created by the torsion spring 256 actuates the gate actuator 116 away from the lock actuator 118 when the gate actuator 116 is released. In this example, the force created by the torsion spring 256 pulls the gate actuator 116 forward until the groove 232 is aligned with the locking pin 226 (which is engaging the guide rail 210). Since the arm 204 was already pulled forward previously when the torsion springs 244, 246 decompressed and the gate was reclosed, the cam follower 250 has already been positioned near the bend 254 again. When the spring coil 248 releases its potential energy, the spring coil 248 pushes the arm 204 downward so that the locking pin 226 reenters the lock groove 224 and the groove 232. Since the locking pin 226 is now in the lock groove 224, the gate 110 is once again locked closed. The locking pin 226 also contacts and pushes the extended portion 230 of the lock actuator 118 downward so that the lock actuator 118 moves past the back of the handle 120 to its original position.

A user can then once again actuate the lock actuator 118 and the gate actuator 116 as explained above to once again unlock, open, close, and then relock the gate 110. Thus, a user can perform all the necessary actions needed to operate the pelican hook 100 with a single hand and without letting go of the handle 120. In this manner, the user can simply use the pelican hook 100 or a pair of the pelican hooks 100 (one for each hand) to climb up a structure. The pelican hook 100 actually may assist the user in the climb since the user can actually use the pelican hook 100 to help pull him up different rails.

Those skilled in the art will recognize improvements and modification to the preferred embodiments of the present disclosure. All such improvements and modifications are considered within the scope of the concepts disclosed herein and the claims that follow.

What is claimed is:
1. A pelican hook, comprising:
a hook that defines a hook gap;
a gate for the hook gap, wherein the gate is configured to be opened so as to open the hook gap and is configured to be closed so as to close the hook gap;
a gate mechanism having a gate actuator and a lock actuator, wherein the gate mechanism is operable to lock the gate closed and wherein the gate mechanism is configured such that actuating the lock actuator toward the gate actuator unlocks the gate and such that actuating the gate actuator toward the lock actuator opens the gate; and a handle configured to allow a user to hold the pelican hook, wherein:
the gate actuator is configured to be positioned at least partially in front of the handle when the gate is closed by the gate mechanism; and
the lock actuator is configured to be positioned at least partially behind the handle when the gate mechanism locks the gate closed.

2. The pelican hook of claim 1, wherein the gate mechanism is further configured such that actuating the gate actuator away from the lock actuator closes the gate and such that the lock actuator is actuated away from the gate actuator when the gate mechanism locks the gate closed.

3. The pelican hook of claim 2, wherein a first one of either the gate actuator or the lock actuator is positioned directly in front of an other one of either the gate actuator or the lock actuator.

4. The pelican hook of claim 1, wherein a first one of either the gate actuator or the lock actuator is positioned directly in front of an other one of either the gate actuator or the lock actuator.

5. The pelican hook of claim 1, wherein:
the gate actuator comprises a gate trigger; and
the lock actuator comprises a lock trigger.

6. The pelican hook of claim 1, wherein the gate mechanism further comprising an arm, a locking pin, a guide rail, and wherein:
the arm is connected between the gate and the gate actuator such that the arm pulls the gate open by actuating the gate actuator toward the lock actuator;
the guide rail defines a lock groove; and
the locking pin extends out of the arm and is positioned to be placed in the lock groove so as to lock the gate closed.

7. The pelican hook of claim 6, wherein the lock actuator is configured to remove the locking pin out of the lock groove when the lock actuator is actuated toward the gate actuator so as to unlock the gate.

8. The pelican hook of claim 7, wherein the gate mechanism further comprises at least one spring actuated mechanism operably associated with the arm such that the at least one spring actuated mechanism increases in potential energy as the gate actuator is actuated toward the lock actuator when the gate is unlocked, and wherein:
the gate actuator defines a second groove and a channel, wherein the channel extends transversely and is continuous with the second groove;
the guide rail is positioned so as to remove the locking pin from the second groove and into the channel once the gate actuator has been actuated a certain distance; and
the at least one spring actuated mechanism is configured to release potential energy so that the arm is pulled to reopen the gate as the locking pin moves through the channel.

9. The pelican hook of claim 6, wherein the gate mechanism further comprises a guide pin, a movable lever, a cam, and a torsion spring, and wherein:
the gate defines a passage;
the guide pin is inserted into the passage;
the guide pin is attached to the movable lever;
the cam is movably attached to the arm and is movably attached to the movable lever such that the movably lever is configured to turn the cam as the gate is being opened and slides the guide pin through the passage in the gate; and the torsion spring engages the gate and the cam so that turning the cam and opening the gate causes the torsion spring to create a force that opposes the opening of the gate.

10. The pelican hook of claim 6, wherein the gate mechanism further comprises a hinge and a torsion spring, and wherein:
the gate turns about the hinge so that the gate is opened and closed; and
the torsion spring is operably associated with the hinge and the gate such that opening the gate causes the torsion spring to create a force that opposes the opening of the gate.

11. The pelican hook of claim 6, wherein the gate mechanism further comprises a spring coil and a cam follower, and wherein:
the guide rail is positioned at an angle so as to remove the locking pin from the second groove and into the channel once the gate actuator has been actuated a certain distance;
the arm defines a bend; and
the spring coil engages the cam follower and the cam follower engages the arm on one side of the bend such that the spring coil pushes the arm downward so that the locking pin reenters the lock groove to lock the gate closed.

12. The pelican hook of claim 1, further comprising a torsion spring configured to actuate the gate actuator away from the lock actuator when the trigger is released.

13. A pelican hook, comprising:
a hook that defines a hook gap;
a gate for the hook gap, wherein the gate is configured to be opened so as to open the hook gap and is configured to be closed so as to close the hook gap;
a handle configured to allow a user to hold the pelican hook;
a gate mechanism having a gate actuator and a lock actuator;
wherein the gate actuator is configured to be positioned at least partially in front of the handle when the gate is closed by the gate mechanism;
wherein the gate mechanism is operable to lock the gate closed;
wherein the lock actuator is configured to be positioned at least partially behind the handle when the gate is locked closed by the gate mechanism; and
wherein the gate mechanism is configured such that actuating the lock actuator toward a front of the handle unlocks the gate and such that actuating the gate actuator toward a back of the handle opens the gate.

14. The pelican hook of claim 13, wherein the gate mechanism is further configured such that actuating the gate actuator toward the front of the handle closes the gate and such that the lock actuator is actuated toward the back of the handle when the gate mechanism locks the gate closed.

15. The pelican hook of claim 13, wherein:
the gate actuator comprises a gate trigger; and
the lock actuator comprises a lock trigger.

16. The pelican hook of claim 13, wherein the gate mechanism further comprises an arm, a locking pin, a guide rail, and wherein:
- the arm is connected between the gate and the gate actuator such that the arm pulls the gate open by actuating the gate actuator toward the back of the handle;
- the guide rail defines a lock groove; and
- the locking pin extends out of the arm and is positioned to be placed in the lock groove so as to lock the gate closed.

17. The pelican hook of claim 16, wherein the lock actuator is configured to remove the locking pin out of the lock groove when the lock actuator is actuated toward the front of the handle so as to unlock the gate.

18. The pelican hook of claim 17, wherein the gate mechanism further comprises at least one spring actuated mechanism operably associated with the arm such that the at least one spring actuated mechanism increases in potential energy as the gate actuator is actuated toward the back of the handle when the gate is unlocked, and wherein:
- the gate actuator defines a second groove and a channel that extends transversely and is continuous with the second groove;
- the guide rail is positioned so as to remove the locking pin from the second groove and into the channel once the gate actuator has been actuated a certain distance; and
- the at least one spring actuated mechanism is configured to release potential energy so that the arm is pulled to reopen the gate as the locking pin moves through the channel.

19. A pelican hook, comprising:
- a hook that defines a hook gap;
- a gate for the hook gap, wherein the gate is configured to be opened so as to open the hook gap and is configured to be closed so as to close the hook gap;
- a gate mechanism having a gate trigger and a lock trigger, wherein the gate mechanism is operable to lock the gate closed and wherein the gate mechanism is configured such that actuating the lock trigger toward the gate trigger unlocks the gate and such that actuating the gate trigger toward the lock trigger opens the gate; and
- a handle configured to allow a user to hold the pelican hook, wherein:
  - the gate trigger is configured to be positioned at least partially in front of the handle when the gate is closed by the gate mechanism; and
  - the lock trigger is configured to be positioned at least partially behind the handle when the gate mechanism locks the gate closed.

\* \* \* \* \*